(12) United States Patent
Brondijk et al.

(10) Patent No.: US 8,560,769 B2
(45) Date of Patent: Oct. 15, 2013

(54) INTERRUPTIBLE FORMATTING

(75) Inventors: Robert Albertus Brondijk, Eindhoven (NL); Stephanus Josephus Maria Van Beckhoven, Eindhoven (NL)

(73) Assignee: Koninkljike Philips N.V., Eindhoven (NL)

( * ) Notice: Subject to any disclaimer, the term of this patent is extended or adjusted under 35 U.S.C. 154(b) by 1800 days.

(21) Appl. No.: 10/557,974

(22) PCT Filed: May 3, 2004

(86) PCT No.: PCT/IB2004/050560
§ 371 (c)(1),
(2), (4) Date: Nov. 17, 2005

(87) PCT Pub. No.: WO2004/105020
PCT Pub. Date: Dec. 2, 2004

(65) Prior Publication Data
US 2006/0282611 A1    Dec. 14, 2006

(30) Foreign Application Priority Data

May 20, 2003 (EP) .................................... 03076513
Dec. 11, 2003 (EP) .................................... 03104631

(51) Int. Cl.
*G06F 13/00* (2006.01)
(52) U.S. Cl.
USPC ........................................................ 711/112
(58) Field of Classification Search
USPC ........................................................ 711/112
See application file for complete search history.

(56) References Cited

U.S. PATENT DOCUMENTS

| 6,084,839 A | 7/2000 | Sims, III |
| 2003/0018851 A1* | 1/2003 | Ikeuchi et al. ................ 711/114 |
| 2003/0033475 A1* | 2/2003 | Sasaki .......................... 711/112 |

FOREIGN PATENT DOCUMENTS

| EP | 1253590 A2 | 10/2002 |
| EP | 1282128 A1 | 2/2003 |
| EP | 1426955 A2 | 6/2004 |
| JP | 2001-043663 A  * | 2/2001 |
| WO | 0122416 A1 | 3/2001 |
| WO | 0195330 A2 | 12/2001 |

OTHER PUBLICATIONS

Machine Translation of JP 2001-043663A document.*
Bill McFerrin; "Information Technology-SCSI Multimedia Commands—3(MMC-3)", NCITS XXX T10/1363-D, Nov. 12, 2001.
ISR: PCT/IB2004/050560.
Written Opinion: PCT/IB2004/050560.

* cited by examiner

*Primary Examiner* — Edward Dudek, Jr.

(57) ABSTRACT

A device for recording information on a storage medium is arranged for formatting the storage medium. The device has a medium interface for interfacing with the storage medium for recording data on the medium and retrieving data from the medium, and a host interface for receiving commands according to a protocol (ATA/ATAPI) from a host. The commands include a format command. The device has a formatter for formatting the storage medium according to a format process indicated by the format command. The formatting includes interrupting the format process until a point in time defined by a further command from the host so that no formatting in the background is performed, and therefore real-time performance of the device is not deteriorated by the formatting.

20 Claims, 6 Drawing Sheets

Figure 1:
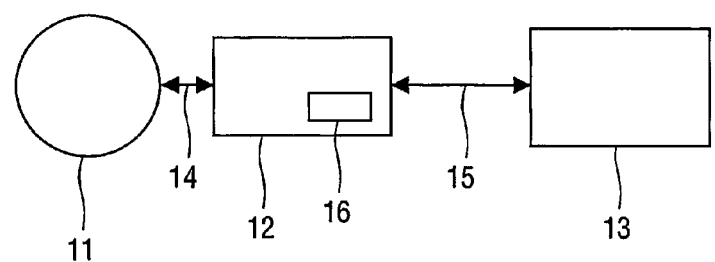

| Bit Byte | 7 | 6 | 5 | 4 | 3 | 2 | 1 | 0 | |
|---|---|---|---|---|---|---|---|---|---|
| 0 | Operation Code (5Bh) ||||||||— 61 |
| 1 | Reserved |||||| IMMED || —62 |
| 2 | Reserved |||| Closure Function |||| —63 |
| 3 | Reserved |||||||| |
| 4 | (MSB) ||| Track Number ||||| |
| 5 | (LSB) |||||||| |
| 6 | Reserved |||||||| |
| 7 | Reserved |||||||| |
| 8 | Reserved |||||||| |
| 9 | Control Byte |||||||| |

| Bit<br>Byte | 7 | 6 | 5 | 4 | 3 | 2 | 1 | 0 |
|---|---|---|---|---|---|---|---|---|
| 0 | Reserved | | | | | | | |
| 1 | FOV | DPRY | DCRT | STPF | IP | Try-out | IMMED | VS |
| 2 | (MSB) Format Descriptor Length | | | | | | | |
| 3 | (LSB) | | | | | | | |

FIG.4

INTERRUPTIBLE FORMATTING

The invention relates to a device for recording information on a storage medium, the device comprising medium interface means for interfacing with the storage medium for recording data on the medium and retrieving data from the medium, host interface means for receiving commands according to a protocol from a host, the commands including a format command.

The invention further relates to a method of formatting a storage medium for recording data and retrieving data, the method comprising receiving commands according to a protocol from a host via a host interface, the commands including a format command.

The invention further relates to a computer program product for formatting the storage medium.

Formatting an optical record carrier is known from a draft proposal of the National Committee for Information Technology Standards (NCITS): Working Draft, T10/1363-D, Revision 10g, Nov. 12, 2001, "INFORMATION TECHNOLOGY—SCSI Multimedia Commands—(revision MMC10g, in this document further called MMC-3). In. MMC-3, it is required to (partially) format a DVD+RW disc before user data may be written to it. In particular in chapter 5.4.3.13.2 it is required that a disc is at least partially formatted by recording the lead-in zone. The problem is that this operation costs time. For a 1×DVD writer, this costs 34 seconds, and for a 2.4×DVD writer, 14 seconds. This time can be directly translated to added cost price of a DVD-Video recorder. This is because a basic requirement of a DVD-Video recorder is that a user should be able to "pop" in an empty DVD+RW into the recorder and press record. Given that every second of recorded video is worst case 10 Mb, a 14 second delay costs 140 Mb's of memory. Such additional memory required in a device would add significant extra cost Therefore it is an object of the invention to provide a formatting system that allows immediate recording while avoiding significant extra cost.

According to a first aspect of the invention the object is achieved with a device for recording information as described in the opening paragraph, the device comprising formatting means for formatting the storage medium according to a format process indicated by the format command, the formatting including interrupting the format process until a point in time defined by a further command from the host.

According to a second aspect of the invention the object is achieved with a method for formatting a storage medium as described in the opening paragraph, the method comprising formatting the storage medium according to a format process indicated by the format command, the formatting including interrupting the format process until a point in time defined by a further command from the host.

According to another embodiment, a computer program product is provided which is embodied in a computer-readable medium for recording information, where the program is operative to cause a processor to perform the method for formatting a storage medium.

The effect of the measures is that the format command has been made interruptible. Being interruptible implies that the remaining format process is delayed to another well defined point in time. It is essential that that point is well defined, because in a DVD-Video Recorder, if a drive takes any autonomous actions, such actions would lead to long response times. For example, a well defined point in time is the moment that a "Close/Track Session" command is given. This command must always be given on a DVD+RW medium before eject or power-down. Hence, the idea is to delay the format process until this command is given. It is to be noted that by interrupting the format process directly after receiving and analyzing the format command results in the storage medium being available for immediate recording.

The invention is also based on the following recognition. In practice the record carrier needs to be readable on pre-existing reading and recording devices, for example DVD (Digital Versatile Disc) players and DVD+RW recorders. Hence the existing devices require at least said partial formatted state as mentioned in MMC-3 in chapter 5.4.3.13.2. The inventors have seen that during a recording session in a new recording device such a (partial) formatted state is not yet required. Hence the formatting is made interruptible, i.e. recording format data is postponed to said well defined later moment in time. It is noted that according to MMC-3 the formatting continues in the background as described in chapter 5.4.3.13.3. However the inventors have seen that in a device for recording real time data such a background formatting (while in progress) causes additional delays when a (foreground) write or read command is received from the host. Hence a device should not take autonomous actions, and therefore background formatting is not a suitable formatting system for real-time recording devices. To comply with real-time requirements the inventors have made the format process interruptible, i.e. the process is fully halted until the end of the recording session.

In an embodiment of the device the formatting means are arranged for said interrupting the format process by interrupting before recording control data in a lead-in area of the storage medium. This has the advantage that no recording time is required for filling the lead-in area, and therefore the device is available immediately for recording user data.

In an embodiment of the device the formatting means are arranged for performing a first part of the format process until receiving a write command from the host, and for said interrupting the format process by delaying the part of the format process remaining after the first part. This has the advantage that in the event that the user does not immediately start a recording session, at least a first part of the formatting process is performed. Hence the waiting time at the end of the recording session is reduced.

Further preferred embodiments of the method and device according to the invention are given in the further claims.

Figure 2:
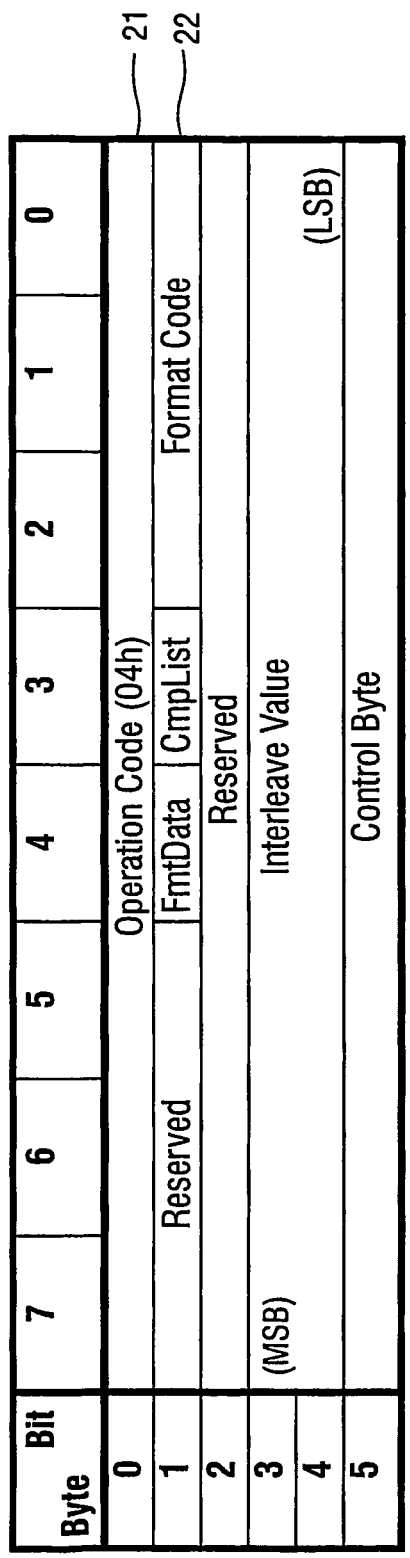
Figure 3:
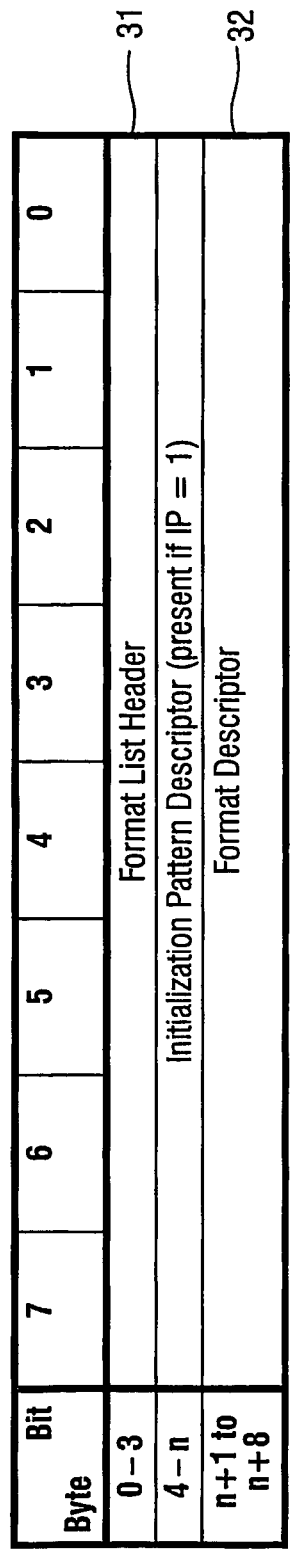
Figure 5:
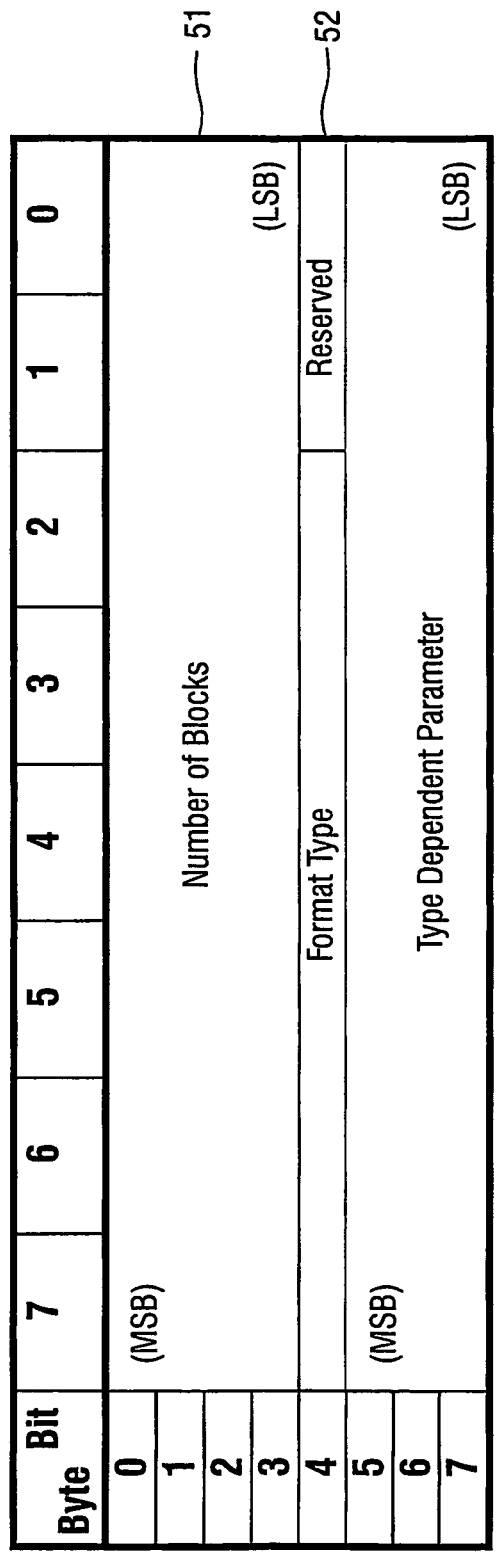
Figure 6:
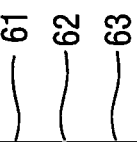

These and other aspects of the invention will be apparent from and elucidated further with reference to the embodiments described by way of example in the following description and with reference to the accompanying drawings, in which FIG. 1 shows a disc-shaped storage medium, recording device and host system, FIG. 2 shows a Format Unit Command, FIG. 3 shows a Format Unit Parameter List, FIG. 4 shows a Format List Header, FIG. 5 shows a Format Code 001b Format Descriptor, and FIG. 6 shows a CLOSE TRACK/SESSION Command Descriptor Block.

In the Figures, elements which correspond to elements already described have the same reference numerals.

FIG. 1 shows a disc-shaped storage medium, recording device and host system. A storage medium 11, for example an optical disc, constitutes a record carrier for a recording device 12. A DVD+RW is an example of such a record carrier as given in MMC-3 (chapter 5.4.3.13.2). A number of functions of the recording device is defined according to a predefined standard, for example the well-known ATA/ATAPI standard described in MMC-3 (chapter 1) and in particular NCITS T13/1321D AT Attachment with Packet Interface 5 (ATA/

ATAPI-5) referenced in MMC-3 (chapter 2.1.2). Hence the device may be called an ATA/ATAPI device. The device 12 has a medium interface 14, e.g. a read/write head, positioning servo system and control circuits commonly known from the CD or DVD system, on one side to interface with the storage medium 11, for example the DVD+RW disc. On the other side, the device 12 has a host interface 15, e.g. an ATA cable, to communicate with a host 13, which may be either a PC or the application side of a video recorder, e.g. having usual elements for input and output of video information. The combination of the four elements: DVD+RW medium, a ATA/ATAPI device plus Host, can form a Consumer DVD+RW Video Recorder. The main focus of this invention is of the application in a DVD+RW Video. Recorder. According to the invention the device has formatting means 16 for formatting the record carrier as described below in detail.

In the following the medium and the protocol over the host interface 15 or ATA cable will more deeply be described. There is a problem in the definition of the protocol as given in MMC-3 and by understanding the relationship between the medium and the protocol, the solution to this problem can be understood.

The ATA cable and its protocol, that are well-known, are described in numerous documents, e.g. the ATA/ATAPI-5 document. The highest protocol level of the cable is given in MMC-3. In the following explanation the storage medium 11 is a DVD+RW medium, a recordable Digital Versatile Disc, which requires for formatting predefined control information to be recorded in specific areas of the record carrier, such as a Control Data Zone in a lead-in area. Obviously only a formatted record carrier can be recognized and handled correctly by recording and/or playback devices. The problem that is addressed in the present invention concerns the FORMAT UNIT command as described in the above MMC-3. In MMC-3, the Format Unit command is defined in chapter 5.4.

FIG. 2 shows a Format Unit Command. The Figure shows a table of the format command. In a first byte 21 an operation code is given. In a second byte 22 further parameters are given, as explained in chapter 5.4 of MMC-3. For DVD+RW media, only FORMAT CODE "0x001" is applicable. Following this 6 byte command, a data block (format parameter list) is send, representing the parameters of this command.

FIG. 3 shows a Format Unit Parameter List The Figure shows a table of the format command parameters. In a first set of bytes 31 a Format List header is given, further explained with FIG. 4. In a second set of bytes 32 a Format Descriptor are given, further explained with FIG. 5. The Format Unit Parameter List is further explained in chapter 5.4 of MMC-3.

FIG. 4 shows a Format List Header. The Figure shows a table of the format list header, which is part of the Format Unit Parameter List. In a first byte 41 format options are defined. In particular the IMMED bit is described below with FIG. 5. In a second set of bytes 42 a Format Descriptor Length is given, the format Descriptor itself being explained with FIG. 5. The Format List Header is further explained in chapter 5.4 of MMC-3. For DVD+RW there need be no Initialization Pattern Descriptor.

FIG. 5 shows a Format Code 001b Format Descriptor. The Figure shows a table of the format descriptor for Format Code 001b, which is part of the Format Unit Parameter List. Format Descriptors for other format codes are given in MMC-3, e.g. for CD–RW in chapter 5.4.2. In a first set of bytes 51 format options are defined. In a second byte 52 a Format Type is given. The Format Code 001b Format Descriptor is further explained in chapter 5.4.3 of MMC-3. For DVD+RW, there are two possibilities for "Format Type", namely 0×24 (MRW Full Format, as described in MMC-3, chapter 5.4.3.12 for DVD MRW as defined in Multimedia Command Set Modifications for DVD+RW Formats, DVD+RW Promoters Group, revision 1.0, March 2001, published by N V Philips, and for CD–RW as defined in CD-MRW Defect Management & Physical Formatting revision 1.0, Mount Rainier Promoters Group, January 2001, published by Philips Electronics NV), and 0×26 (DVD Video, i.e. DVD+RW compatible with DVD-Video as defined in the DVD standard for Read-Only discs). A difference is that in DVD-Video the start of the user data zone (=logical address zero) is fixed, whereas in DVD MRW a logical zero is defined by the format command and is stored on the record carrier (e.g. in the lead-in, in a DVD reserved zone). According to MMC-3, the drive must, in both cases, first completely write the lead-in before allowing write access to the user-data area, while further formatting may be performed using background formatting. The definition of the lead-in can be read in the DVD+RW Physical Format Specification. In that specification, one can read that the minimal lead-in extends from 23.4 mm to 24.0 mm. This area contains two important information zones: the inner disc identification zone and the control-data zone. They tell the ATA/ATAPI device about the disc status. Given the size of this zone, a device, which can write a 2.4×DVD (2.4×11.08 Mbits/sec), will take at least 14 seconds to write it.

When a FORMAT command is given, the device may start the actual format process. Whether this command, and its underlying process, must be completed immediately depends on the value of the IMMED bit. If the IMMED bit is zero, the drive will occupy the ATA bus until the lead-in has been fully formatted. According to the MMC-3 (e.g. chapter 5.4.3.12.1), if the IMMED is one, the Format Unit command terminates with GOOD status and proceeds with all format-writing functions performed in the background. The device status will be Nor Ready/Format In Progress.

According to the invention, if the IMMED bit is one, then the drive will immediately issue a Command Complete and status is READY (in response to Test unit ready or REQUEST SENSE commands). Hence the host interface is arranged for issuing a ready status before completing the (partial) format process in response to receiving a format command that indicates a format process of an interruptible type. It is to be noted that the function of the IMMED indicator in MMC-3 is to indicate that partial formatting is needed and background formatting may take place. In the current invention such partial and background formatting is not applied. On the contrary, the formatting process is completely halted until the recording session is ended. As described above, the host interface is arranged for receiving a format command which includes an immediate indicator (IMMED). The immediate indicator has a first value indicating a complete format process and a second value indicating a format process of an interruptible type, to be executed as follows.

In an embodiment the device will start formatting the lead-in if the host does not immediately issue a write command. At the first write command, the device will immediately stop writing the lead-in, if it had the time to start, and will delay the rest of the format process until after a valid CloseTrackSession command has been issued, as described below with FIG. 6. The formatting process is adapted for being interruptible, i.e. the device anticipates an interruption. It is to anticipate it by not writing either the FDCB nor the Control-data zone until the rest of the lead-in has been written. The FDCB is the most important information block on the disc and is located in the inner disc identification zone in the lead-in. The control-data zone is important for ROM devices for discovering the disc status. Only after the device has had the time to complete the formatting process, it will first write the Control-Data zone followed by the FDCB. The reason for leaving these zones unwritten is that there is no way to store the formatting status of the lead-in in the FDCB. The reason for recording the FDCB as the last item is for two reasons:

1. It is only a single ECC block and therefore can be written very quickly. This is important because the device wants to be able to quickly respond to a write interruption. The Control-Data zone contains 192 ECC blocks and therefore takes a lot longer to write.
2. Without an FDCB, the disc state is not defined. This means that another DVD+RW capable writer will be forced to either regard the disc either as empty or must scan the disc to discover its state. This is correct behavior because if there was some kind of system failure which caused the disc to be ejected before the format completed, the contents of the user data area can not be trusted either.

In the event that the device is able to write some, and not all of the blocks in the lead-in before the host issues a write command, the device keeps track of the progress of the format process, in particular which parts have been formatted. The writing of the FDCB and Control-Data areas will be recorded at the end of the format process. Hence the formatting is arranged for recording a format disc control block (FDCB) after completing the format process after said interrupting.

In an embodiment the device is arranged for a recovery process for the event that the format progress is unknown. The formatting process will begin anew at the CloseTrackSession command. Previously recorded format data will be recorded again in the same location (on a rewritable record carrier) or in a different (spare) location (on a write-once medium).

In an embodiment, as mentioned in the introduction, the idea is to postpone the format process to a predefined moment at a host command that indicates an end of the recording of user data, such as a valid CloseTrack Session command, described below. Hence the formatting includes interrupting the format process until a point in time defined by a further command from the host. In particular the formatting interrupts the format process before recording control data in a lead-in area of the storage medium.

FIG. 6 shows a CLOSE TRACK/SESSION Command Descriptor Block. The Figure shows a table of the command for ending recording user data by closing a track or session. In a first byte 61 an operation code is given. In a second byte 62 further parameters are given including an immediate indicator (IMMED), as explained in chapter 5.3 of MMC-3. In a third byte 63 a Closure Function is given, which is also defined in MMC-3 chapter 5.3. A new function in view of the "Closure Function" according to the present invention is as follows. The idea is that if the format action was postponed, then it will continue regardless of the parameters of the Closure Function. This is an important statement because Closure Function 0×0 is defined as "Do not alter lead-in and allow the drive to eject the disc". In the case of the postponement as currently defined, this function is adapted to: "Do not alter the lead-in, unless it has not yet been written, and allow the drive to eject the disc".

In this command the IMMED bit does not interrupt the CloseTrack process, it only influences the time of command completion. If the IMMED bit is one, the status of the drive will remain "BUSY" until the format process and CloseTrack action (update FDCB and Control-Data zone to reflect the status of the disc and the writing of a (temporary) lead-out).

Although the invention has been mainly explained by embodiments using DVD+RW optical discs, the invention is also suitable for other record carriers such as rectangular optical cards, magneto-optical discs, high-density (Blu-ray) discs or any other type of information storage system that has a recordable layer that is to be formatted.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. A device for recording information on a storage medium, the device comprising:
   medium interface means for interfacing with the storage medium for recording data on the medium and retrieving data from the medium;
   host interface means for receiving commands according to a protocol from a host, the commands including a format command; and
   formatting means for formatting the storage medium according to a format process indicated by the format command, the formatting including interrupting the format process until a point in time defined by a further command from the host, wherein the formatting means are arranged for said interrupting the format process after receiving the format command, and wherein the formatting means are further arranged to begin the formatting anew in response to the further command when progress the formatting that was interrupted is unknown and to record again previously recorded format data.

2. The device as claimed in claim 1, wherein the formatting means are arranged for said interrupting the format process by interrupting before recording control data in a lead-in area of the storage medium.

3. The device as claimed in claim 1, wherein the further command is a close track or a close session command.

4. The device as claimed in claim 1, wherein the formatting means are arranged for recording a format disc control block after completing the format process after said interrupting.

5. The device as claimed in claim 1, wherein the host interface means are arranged for issuing a ready status before completing the format process in response to receiving a format command that indicates a format process of an interruptible type.

6. The device as claimed in claim 1, wherein the host interface means are arranged for receiving a format command which includes an immediate indicator,
   the immediate indicator having a first value indicating a complete format process, and
   the immediate indicator having a second value indicating a format process of an interruptible type.

7. The device of claim 1, wherein the previously recorded format data is recorded again in a same location as was previously recorded.

8. A method of formatting a storage medium for recording data and retrieving data, the method comprising the acts of:
   receiving commands according to a protocol from a host via a host interface, the commands including a format command; and
   formatting the storage medium according to a format process indicated by the format command, the formatting act including the act of interrupting the format process after receiving the format command until a point in time defined by a further command from the host, wherein the formatting act begins the format process anew in response to the further command when progress the format process that was interrupted is unknown and records again previously recorded format data.

9. The method of claim 8, further comprising the act of recording a format disc control block after completing the format process after said interrupting.

10. The method of claim 8, wherein the interrupting is performed before recording control data in a lead-in area of the storage medium.

11. The method of claim 8, wherein the formatting act further includes the act of performing a first part of the format process until receiving a write command from the host, and said interrupting act includes the act of delaying a second part of the format process remaining after the first part.

12. The method of claim 8, wherein the further command is a close track or a close session command.

13. The method of claim 8, further comprising the act of issuing a ready status before completing the format process in response to receiving a format command that indicates a format process of an interruptible type.

14. The method of claim 8, further comprising the act of receiving a format command which includes an immediate indicator, the immediate indicator having a first value indicating a complete format process, and the immediate indicator having a second value indicating a format process of an interruptible type.

15. The method of claim 8, wherein the previously recorded format data is recorded again in a same location as was previously recorded.

16. A non-transitory computer readable medium embodying computer instructions which, when executed by a processor, configure the processor to perform the acts of:
   receiving commands according to a protocol from a host via a host interface, the commands including a format command; and
   formatting the storage medium according to a format process indicated by the format command the formatting act including the act of interrupting the format process after receiving the format command until a point in time defined by a further command from the host,
   wherein the formatting act begins the format process anew in response to the further command when progress the format process that was interrupted is unknown and records again previously recorded format data.

17. A device for recording information on a storage medium, the device comprising:
   a medium interface that interfaces with the storage medium for recording data on the medium and retrieving data from the medium;
   a host interface that receives commands according to a protocol from a host, the commands including a format command; and
   a formatter that formats the storage medium according to a format process indicated by the format command, the formatter interrupting the format process until a point in time defined by a further command from the host, wherein the formatter is arranged for said interrupting the format process directly after receiving the format command, and wherein the formatter begins the format process anew in response to the further command when progress the format process that was interrusted is unknown and records again previously recorded format data.

18. The device of claim 17, wherein a format disc control block is recorded after completing the format process after said interrupting.

19. The device of claim 17, wherein the formatter are arranged for said interrupting the format process by interrupting before recording control data in a lead-in area of the storage medium.

20. The device of claim 18, wherein the previously recorded format data is recorded again in a same location as was previously recorded.

* * * * *